(12) United States Patent
Bando (10) Patent No.: US 7,624,392 B2
(45) Date of Patent: Nov. 24, 2009

(54) USB DEVICE SET

(75) Inventor: Kazuhiko Bando, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 676 days.

(21) Appl. No.: 10/847,355

(22) Filed: May 18, 2004

(65) Prior Publication Data

US 2006/0031623 A1    Feb. 9, 2006

(51) Int. Cl.
   *G06F 9/44*        (2006.01)
   *G06F 9/445*      (2006.01)
   *G06F 3/00*        (2006.01)
   *G06F 13/38*      (2006.01)

(52) U.S. Cl. .................. 717/169; 717/175; 710/10; 710/63; 719/327

(58) Field of Classification Search ............. 717/169
See application file for complete search history.

(56) References Cited

U.S. PATENT DOCUMENTS

| | | | | |
|---|---|---|---|---|
| 6,012,103 | A * | 1/2000 | Sartore et al. ................. | 710/8 |
| 6,496,979 | B1 * | 12/2002 | Chen et al. .................. | 717/178 |
| 6,704,824 | B1 * | 3/2004 | Goodman .................... | 710/300 |
| 6,738,834 | B1 * | 5/2004 | Williams et al. ............... | 710/8 |
| 6,754,722 | B2 * | 6/2004 | Herzi ........................... | 710/8 |
| 7,047,528 | B2 * | 5/2006 | Iida ............................. | 717/170 |
| 7,065,769 | B1 * | 6/2006 | Tolopka ....................... | 719/321 |
| 7,246,348 | B1 * | 7/2007 | Mixer, Jr. ..................... | 717/168 |
| 7,293,117 | B2 * | 11/2007 | Ohta ........................... | 710/10 |
| 2003/0051084 | A1 * | 3/2003 | Rosen ......................... | 710/72 |
| 2004/0088456 | A1 * | 5/2004 | Zhang .......................... | 710/74 |
| 2005/0022178 | A1 * | 1/2005 | Ghafoor et al. ............... | 717/171 |
| 2005/0022212 | A1 * | 1/2005 | Bowen ........................ | 719/321 |
| 2005/0028172 | A1 * | 2/2005 | Yoshikawa et al. .......... | 719/321 |

(Continued)

FOREIGN PATENT DOCUMENTS

JP     2000/339263     12/2000

(Continued)

OTHER PUBLICATIONS

"Introduction to USB On-The-Go", May 5, 2003, <www.usb.org> website, accessed on Apr. 17, 2008 from <http://web.archive.org/web/20030505064744/www.usb.org/developers/onthego/introduction.pdf>.*

(Continued)

*Primary Examiner*—James Rutten
(74) *Attorney, Agent, or Firm*—Volentine & Whitt, P.L.L.C.

(57) ABSTRACT

A USB device set includes a first USB device, which is operable both as a host device and as a peripheral device; and a second USB device, which is operable both as a host device, and as a peripheral device. Each of the first and second USB devices includes: a first memory region storing device drivers of other USB devices; a second memory region storing its own device driver; and a device driver control circuit, which can update device drivers stored at least in the first memory region. In one of the first and second USB devices that is operating as a peripheral device, the device driver control circuit receives information on the device driver of the other USB device, operating as a host device, when the first and second USB devices are firstly connected to each other; and updates the first memory region in accordance with the received information.

10 Claims, 8 Drawing Sheets

U.S. PATENT DOCUMENTS

2005/0223119 A1 * 10/2005 Keys et al. ..................... 710/1

FOREIGN PATENT DOCUMENTS

| JP | 2002/108797 | 4/2002 |
|---|---|---|
| JP | 2003-114859 | 4/2003 |
| JP | 2003-122353 | 4/2003 |
| JP | 2003-122699 | 4/2003 |

OTHER PUBLICATIONS

Stanley et al. "On-the-Go Supplement to the USB 2.0 Specification" Accessed Oct. 24, 2008 from <http://www.usb.org/developers/onthego/otg1_0.pdf>, Revision 1.*

* cited by examiner

USB DEVICE SET

TECHNICAL FIELD OF THE INVENTION

The present invention relates to a USB (Universal Serial Bus) device, which is connected by a USB cable, and more particular to, a USB device that can function both as a host device and a peripheral device.

BACKGROUND OF THE INVENTION

When a host (master) device and a peripheral (slave) device are connected to each other by a USB cable, a device driver of the peripheral device is required to be installed in the host device before substantial operation starts. Usually, a device driver, which is software used for controlling a peripheral device, may be provided from an external storage or downloaded via the Internet.

Recently, there are a variety of USB devices that are functioning or operating both as a host device and as a peripheral device.

OBJECTS OF THE INVENTION

An object of the present invention to provide a USB device set, in which device drivers are efficiently shared and updated between two of the connected devices.

Another object of the present invention is to provide a method that efficiently share and update device drivers between two of the connected devices.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to an aspect of the present invention, a USB device set includes a first USB device, which is operable both as a host device and as a peripheral device; and a second USB device, which is operable both as a host device, and as a peripheral device. Each of the first and second USB devices includes: a first memory region storing device drivers of other USB devices; a second memory region storing its own device driver; and a device driver control circuit, which can update device drivers stored at least in the first memory region. In one of the first and second USB devices that is operating as a peripheral device, the device driver control circuit receives information on the device driver of the other USB device, operating as a host device, when the first and second USB devices are firstly connected to each other; and updates the first memory region in accordance with the received information.

According to the above described USB device set of the present invention, a device driver of a host device is updated in a peripheral device when the first and second USB devices are firstly connected to each other. For example, when the first and second USB devices are connected and operating as host and peripheral devices, respectively, a device driver for controlling the second USB device is updated at the first memory region in the first USB device; and a device driver for controlling the first USB device is updated at the first memory region in the second USB device as well. After that, when the first and second USB devices are reconnected and operating as peripheral and host devices, respectively, it is unnecessary to update or install a device driver for controlling the first USB device, which is a peripheral device, at the first memory region in the second USB device.

The device driver control circuits of the first and second USB devices may exchange information on device drivers of other USB devices each other; and share and update device drivers stored in the first memory region of each USB device. According to this feature, device drivers stored in each of the connected devices are shared efficiently with each other. In other words, the frequency of downloading and installing operation for future connection can be decreased.

According to another aspect of the present invention, a method includes the steps of: connecting first and second USB devices to each other, in which each device is operable both as a host device and a peripheral device; exchanging information of device drivers between the first and second USB devices; and updating device drivers stored in each of the first and second USB devices.

The method may include a step of exchanging information on device drivers of other (unconnected) USB devices between the first and second USB devices; and sharing device drivers stored in each USB device.

DETAILED DISCLOSURE OF THE INVENTION

In the following detailed description of the preferred embodiments, reference is made to the accompanying drawings which forma part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
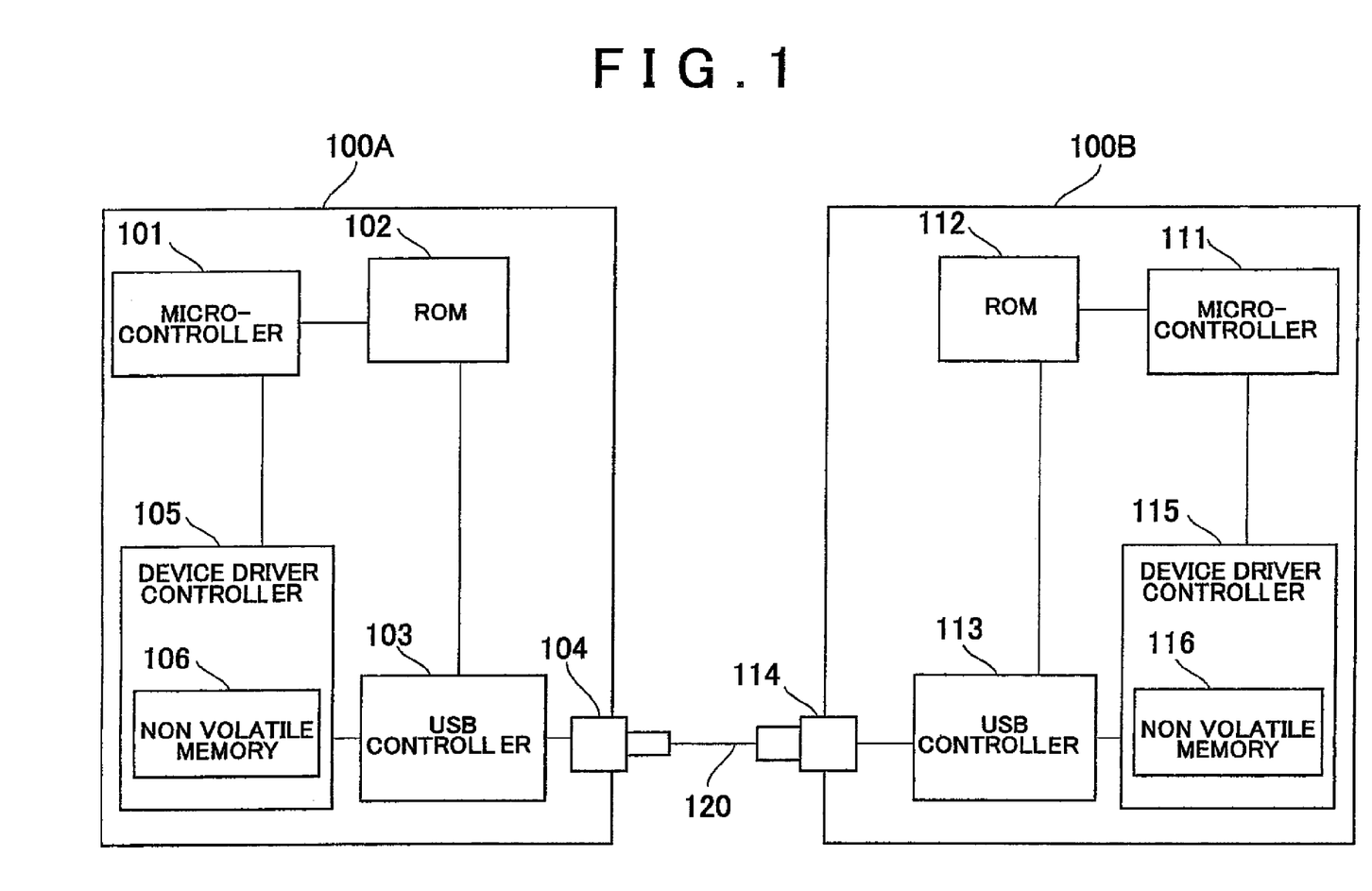
FIG. 1 is a block diagram illustrating a USB device set according to a first preferred embodiment of the present invention.

FIG. 1 is a block diagram illustrating a USB device set according to a first preferred embodiment of the present invention. The USB device set includes a first USB device 100A, a second USB device 100B, and a USB cable 120 connecting the first and second USB devices 100A and 100B to each other. Each of the first and second USB devices 100A and 100B is designed to be able to function and operate both as a host device (master) and a peripheral device (slave). In the case shown in FIG. 1, the first and second USB devices 100A and 100B are functioning as a host device and a peripheral device, respectively.

The present invention is applicable to USB devices such as a digital camera, which can be controlled by a computer and can control a printer. The present invention is applicable a variety of other USB devices, such as a printer, a scanner, a mobile phone, a computer, and so on.

The first USB device 100A includes a micro-controller 101; a ROM 102; a USB controller 103; a USB connector 104; a device driver controller 105; and a non-volatile memory 106. Other types of storage can replace the ROM 102. The non-volatile memory 106 may be a flash memory. The micro-controller 101 is connected to the ROM 102 and the device driver controller 105. The non-volatile memory 106 is provided in the device driver controller 105, but can be provided out of the device driver controller 105. The USB controller 103 is connected between the device driver controller 105 and the USB connector 104. The USB connector 104 is designed so that either A-plug or B-plug of the USB cable 120 can be coupled thereto.

The ROM 102 stores an operating system to be used for controlling the first USB device 100A. The ROM 102 also stores a device driver of a peripheral device, when the first USB device 100A is used as a host device. The ROM 102 may further store device drivers for other USB devices, which have been installed, and data to be transmitted in a data communication process, which is different from USB communication.

The USB controller 103 includes a USB interface for performing data communication with the connected USB device. Data transmitted from the other USB device (100B) may be stored in the ROM 102 or the non-volatile memory 106. Data stored in the ROM 102 and the non-volatile memory 106 can be transmitted to the other USB device (100B) under control of the USB controller 103. The non-volatile memory 106 stores a device driver of the first USB device 100A itself, which is to be used when the first USB device 100A is functioning as a peripheral device.

When an A-plug of the USB cable 120 is connected, the USB device is functioning as a host device. On the other hand, a B-plug of the USB cable 120 is connected, the USB device is functioning as a peripheral device.

The second USB device 100B includes a micro-controller 111; a ROM 112; a USB controller 113; a USB connector 114; a device driver controller 115; and a non-volatile memory 116. The ROM 112 can be replaced by other types of storage. The non-volatile memory 116 may be a flash memory. The micro-controller 111 is connected to the ROM 112 and the device driver controller 115. The non-volatile memory 116 is provided in the device driver controller 115, but can be provided out of the device driver controller 115. The USB controller 113 is connected between the device driver controller 115 and the USB connector 114. The USB connector 114 is designed so that either A-plug or B-plug of the USB cable 120 can be coupled thereto.

The ROM 112 stores an operating system, which is software to be used for controlling the second USB device 100B itself. The ROM 112 also stores a device driver of a peripheral device, when the second USB device 100B is used as a host device. The ROM 112 may further store device drivers for other USB devices, which have been installed, and data to be transmitted in a data communication process.

The USB controller 113 includes a USB interface for performing data communication with the connected USB device. Data transmitted from the connected USB device may be stored in the ROM 112 or the non-volatile memory 116. Data stored in the ROM 112 and the non-volatile memory 116 can be transmitted to the other USB device (100A) under control of the USB controller 113. The non-volatile memory 116 stores a device driver of the second USB device 100B itself, which is to be used when the second USB device 100B is functioning as a peripheral device.

When an A-plug of the USB cable 120 is connected, the USB device is functioning as a host device. On the other hand, a B-plug of the USB cable 120 is connected, the USB device is functioning as a peripheral device.

Figure 2A:
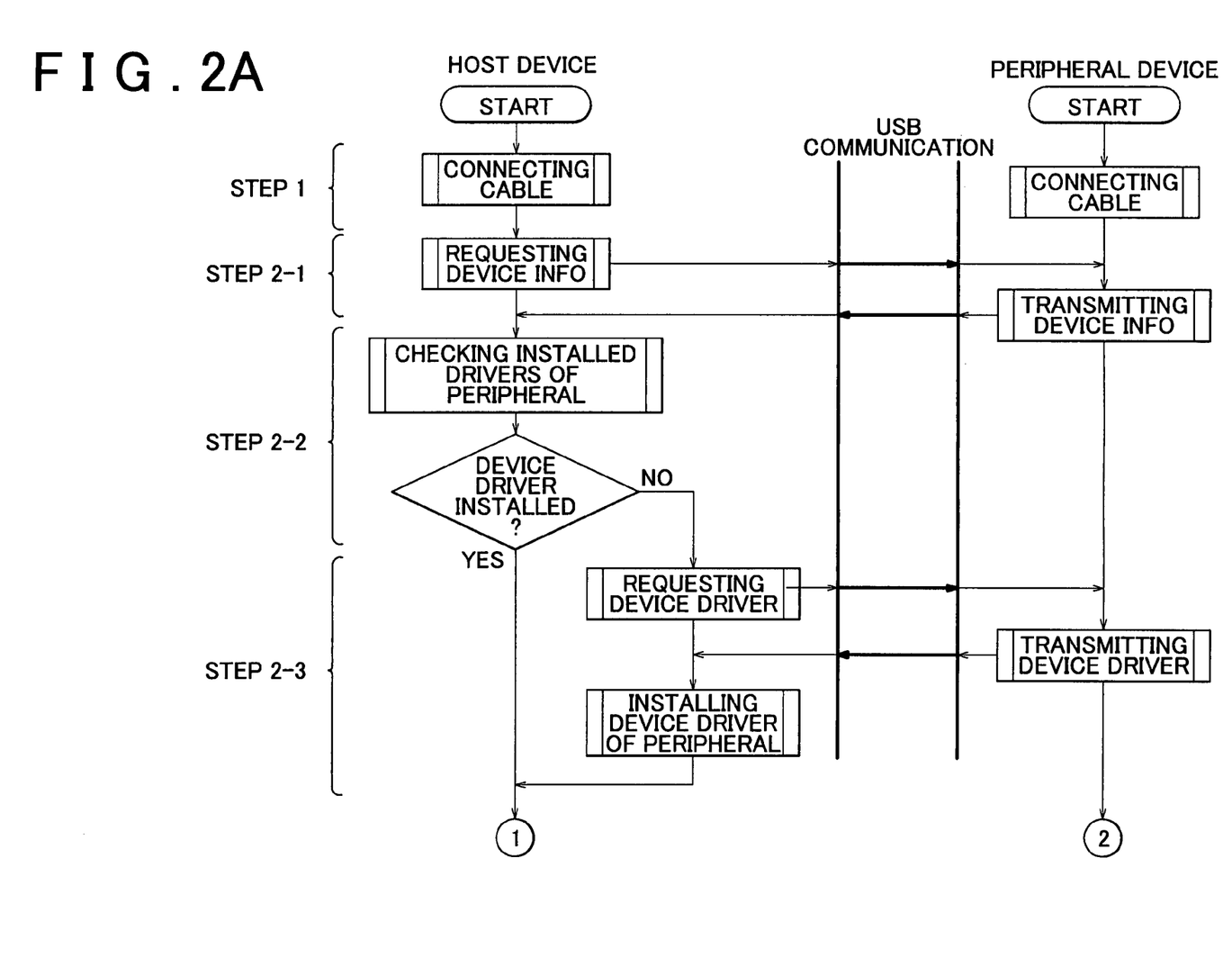
FIGS. 2A and 2B are flow charts showing operation of the first preferred embodiment.
Figure 2B:
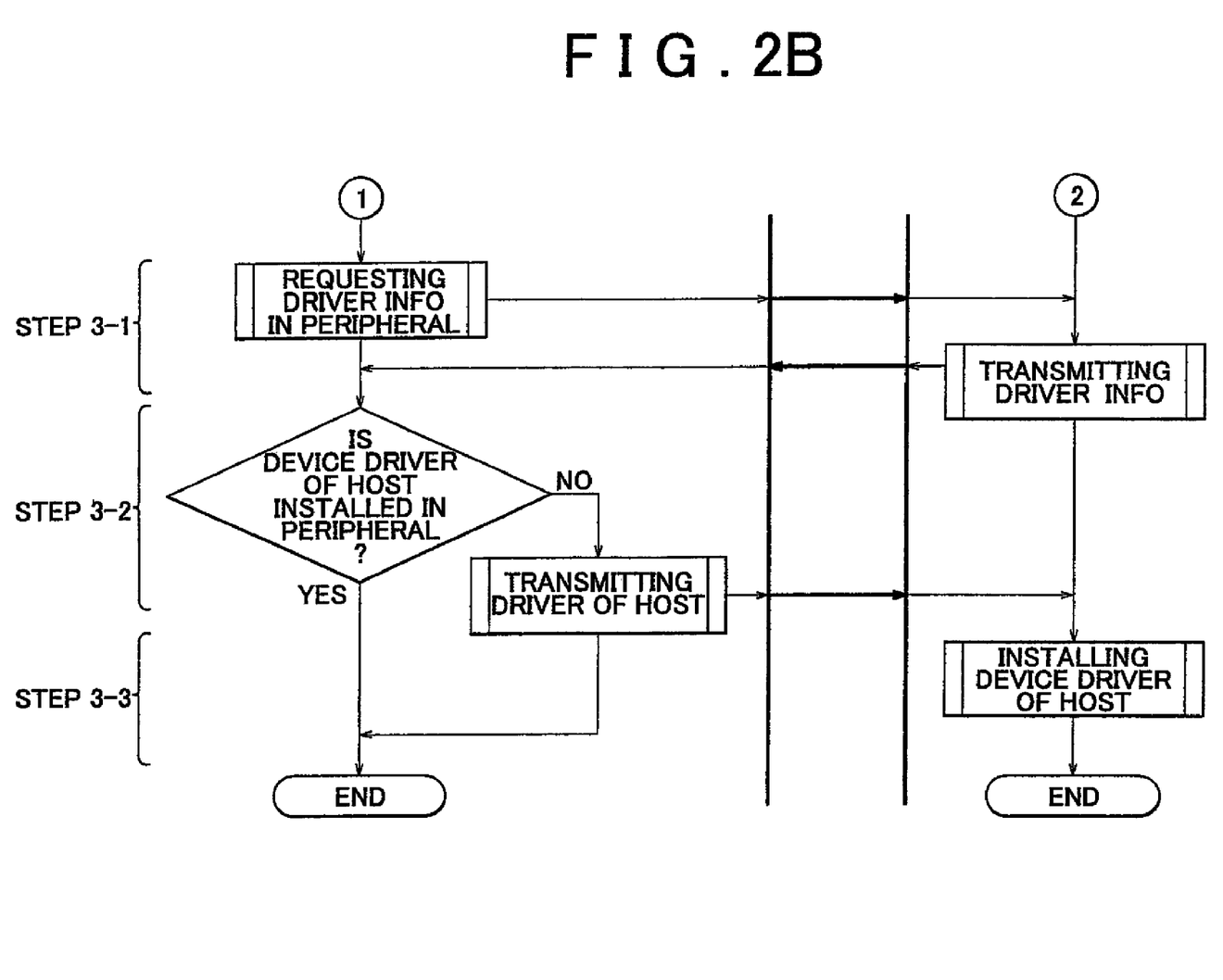

FIGS. 2A and 2B are flow charts showing operation of the first preferred embodiment. In step 1, the first and second USB devices 100A and 100B are connected to each other by the USB cable 120. A-plug and B-plug of the USB cable 120 are coupled to the first and second USB devices 100A and 100B, respectively, so that the first and the second USB devices 100A and 100B are functioning as host and peripheral devices, respectively.

Next, in step 2-1, the device driver controller 105 of the first USB device 100A receives necessary information from the second USB device 100B. The information includes at least a maker and a type of the device. The USB controller 103 controls such a USB data communication, which is not a type of communication for controlling devices.

In step 2-2, the device driver controller 105 searches information of device drivers stored in the ROM 102, and compares the searched information with the information, transmitted from the second USB device 100B. Based on the result of such a comparison, the device driver controller 105 finds whether a device driver that is necessary to control the second USB device 100B has been installed in the first USB device 100A.

In step 2-3, if a necessary device driver for controlling the second USB device B has been installed in the first USB device 100A, the process would go to step 3. On the other hand, if a necessary device driver for controlling the second USB device B is not installed in the first USB device 100A, the first USB device 100A would transmit a request signal to the second USB device 100A. In response to the request signal, a device driver stored in the non-volatile memory 116 is transmitted to the first USB device 100A by USB data communication and is installed in the ROM 102. Thus, an installation process of a device driver for the second USB device 100B is completed.

In this specification, "USB communication" does not include communication for controlling connected devices, which is carried out after necessary device driver is downloaded and installed. In other words, "USB communication" includes communication for downloading device drivers, exchanging information on device drivers and requesting device drivers.

In step 3-1, the first USB device 100A obtain device driver information stored in the ROM 112 of the second USB device 100B using USB data communication technique.

In step 3-2, the device driver controller 105 compares the information obtained from the second USB device 100B and information of its own device driver stored in the non-volatile memory 106. In accordance with the comparison, the device driver controller 105 finds if a necessary device driver for controlling the first USB device 100A is installed in the second USB device 100B. If the device driver is not installed in the second USB device 100B, the process would go to step 3-3.

In step 3-3, the device driver stored in the non-volatile memory 106 is transmitted to the second USB device 100B using USB data communication. In the second USB device 100B, the transmitted device driver is installed in the ROM 112.

As described above, according to the first preferred embodiment of the present invention, the second USB device (peripheral device) 100B receives information on the device driver of the first USB device 100A (host device), when the first and second USB devices 100A and 100B are firstly connected to each other. After that, the ROM 112 is updated. That is, if the device driver of the first USB device 100A (host) has not been installed in the second USB device (peripheral) 100B, the device driver stored in the non-volatile memory 106 of the first USB device 100A is transmitted and installed in the ROM 112.

In other words, a device driver of a host device is updated in a peripheral device when the first and second USB devices are firstly connected to each other. For example, when the first and second USB devices 100A and 100B are connected and operating as host and peripheral devices, respectively, a device driver for controlling the second USB device 100B is updated in the first USB device 100A; and a device driver for controlling the first USB device 100A is updated in the second USB device 100B as well. After that, when the first and second USB devices 100A and 100B are reconnected and operating as peripheral and host devices, respectively, it is unnecessary to update or install a device driver for controlling the first USB device 100A in the second USB device 100B. As a result, starting time of USB devices can be shortened and starting operation becomes simple.

Figure 3:
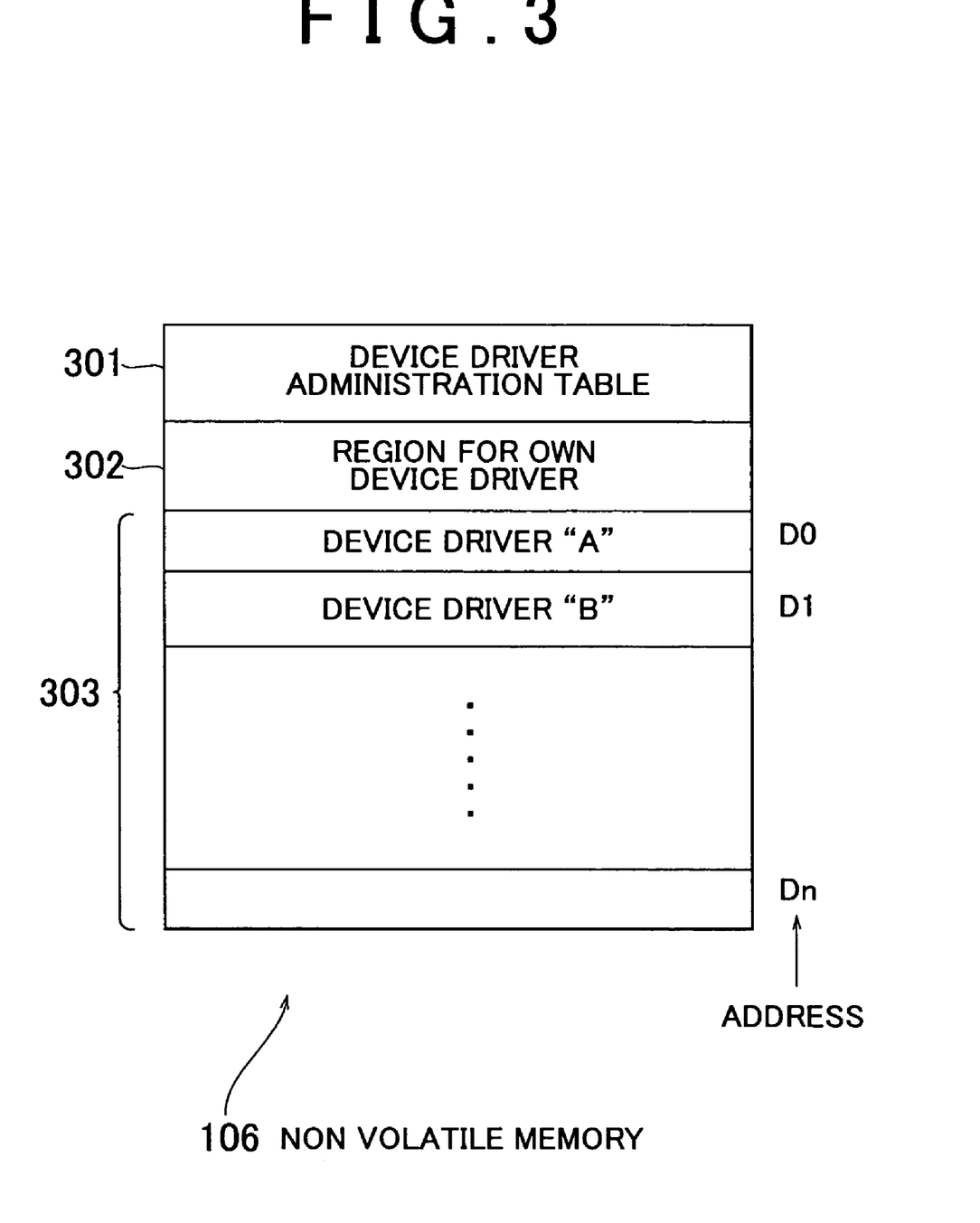
FIG. 3 is a memory configuration of a non-volatile memory used in a USB device set according to a second preferred embodiment of the present invention.

FIG. 3 is a memory configuration of a non-volatile memory (106) used in a USB device set according to a second preferred embodiment of the present invention. The non-volatile memory 106 includes a device driver administration table 301; a region for own device driver 302 in which its own device driver is stored; and device driver storing regions for others 303. The device driver administration table 301 stores information regarding device drivers stored in the device driver regions 303. The own device driver region 302 stores a device driver used for controlling itself. The device driver regions 303 stores device drivers for others, which are identified by their own addresses D0-Dn.

Figure 4:
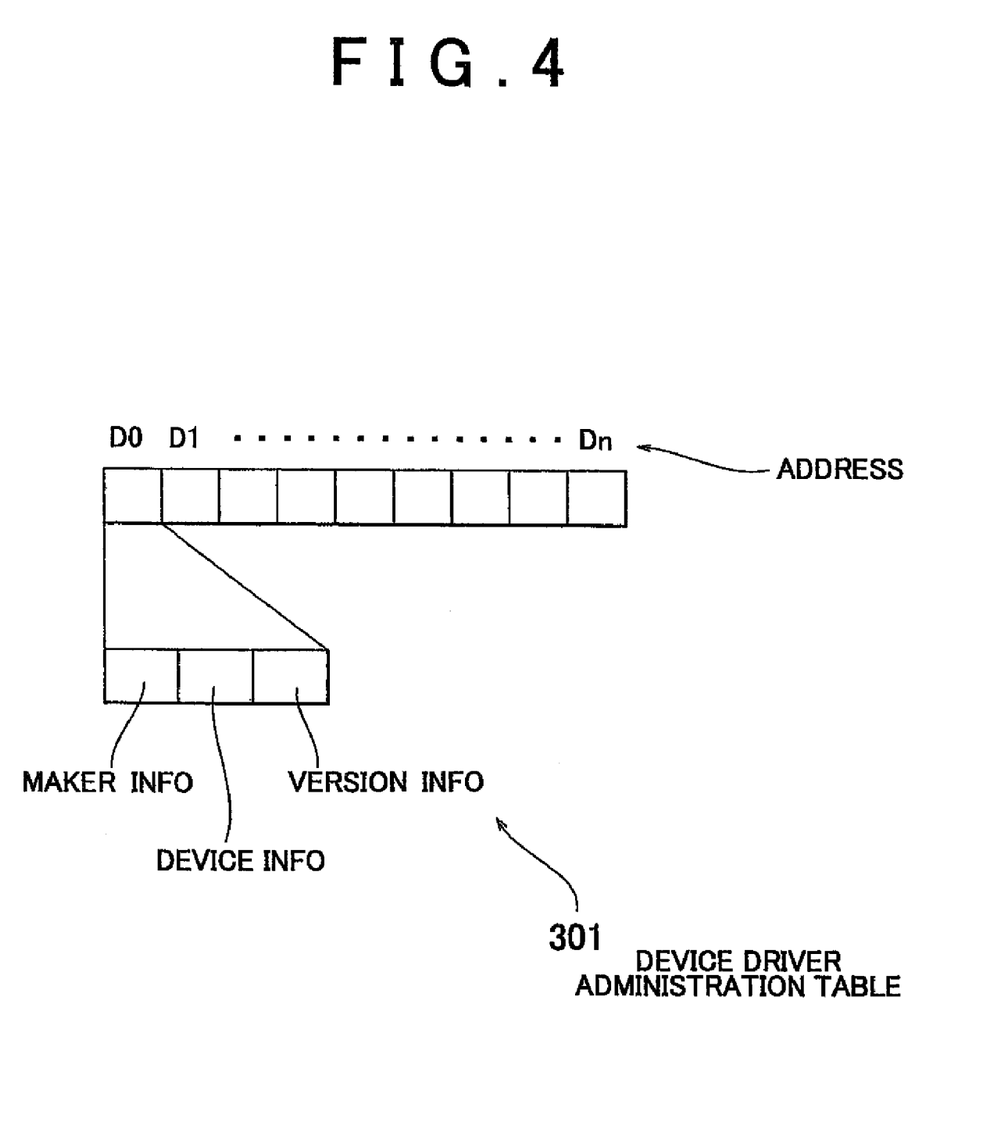
FIG. 4 is a memory configuration showing a part of FIG. 3.

FIG. 4 is a memory configuration of the device driver administration table 301, which are accessed with driver addresses D0-Dn. The device driver administration table 301 stores information on each device driver stored in the device driver region 303. The information stored in the table 301 includes a maker (manufacture), a value identifying the device, a version data for the device driver, etc. If no device driver is stored in a specific address, information showing that situation is stored at the address.

The region 302 for its own device driver and the region 303 for other device drivers can be combined to have a single memory region. The device driver administration table 301 can be arranged out of the non-volatile memory 106. For example, the device driver administration table 301 can be arranged in the ROM 102.

Figure 5A:
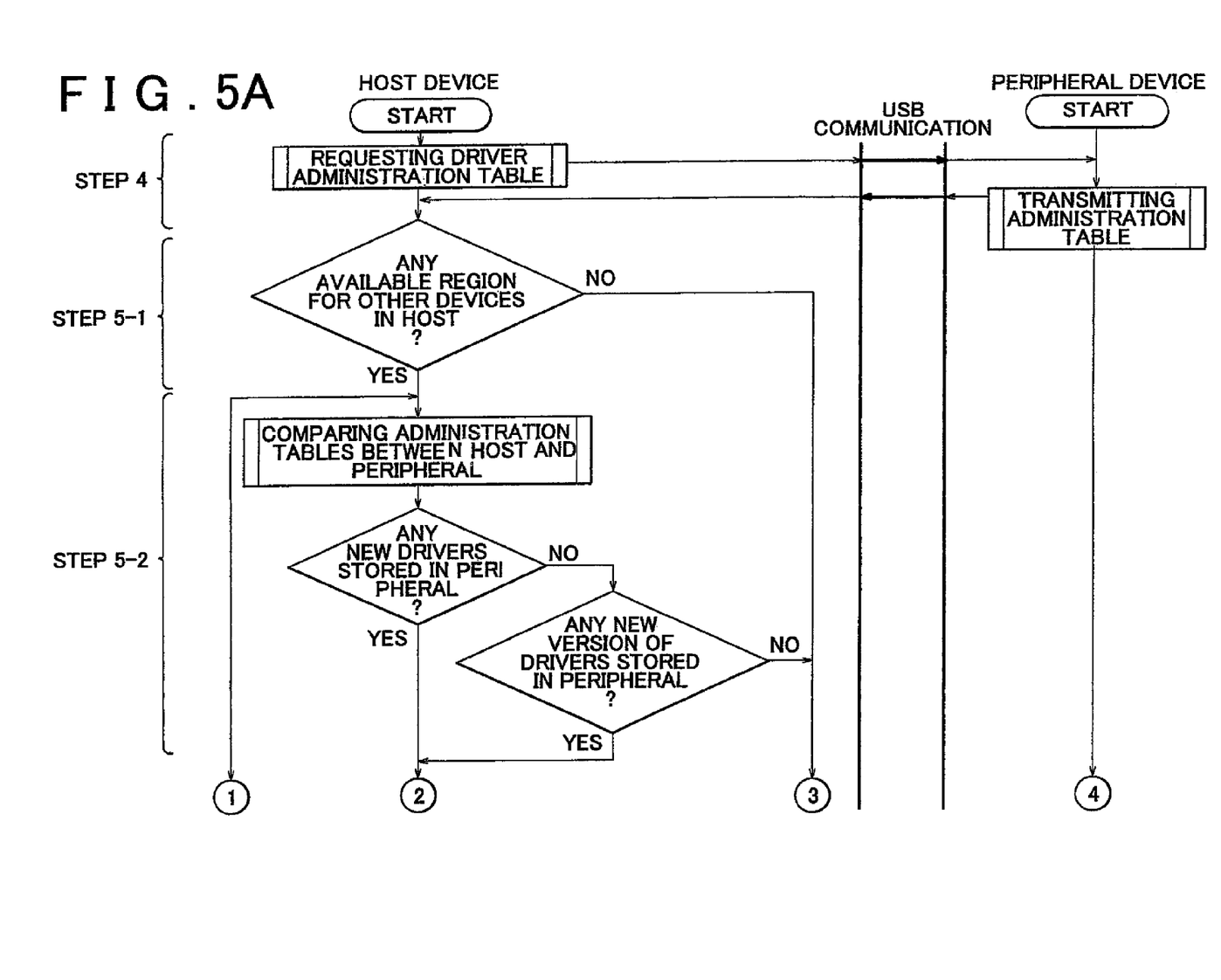
FIGS. 5A-5C are flow charts showing the operation of the second preferred embodiment.
Figure 5B:
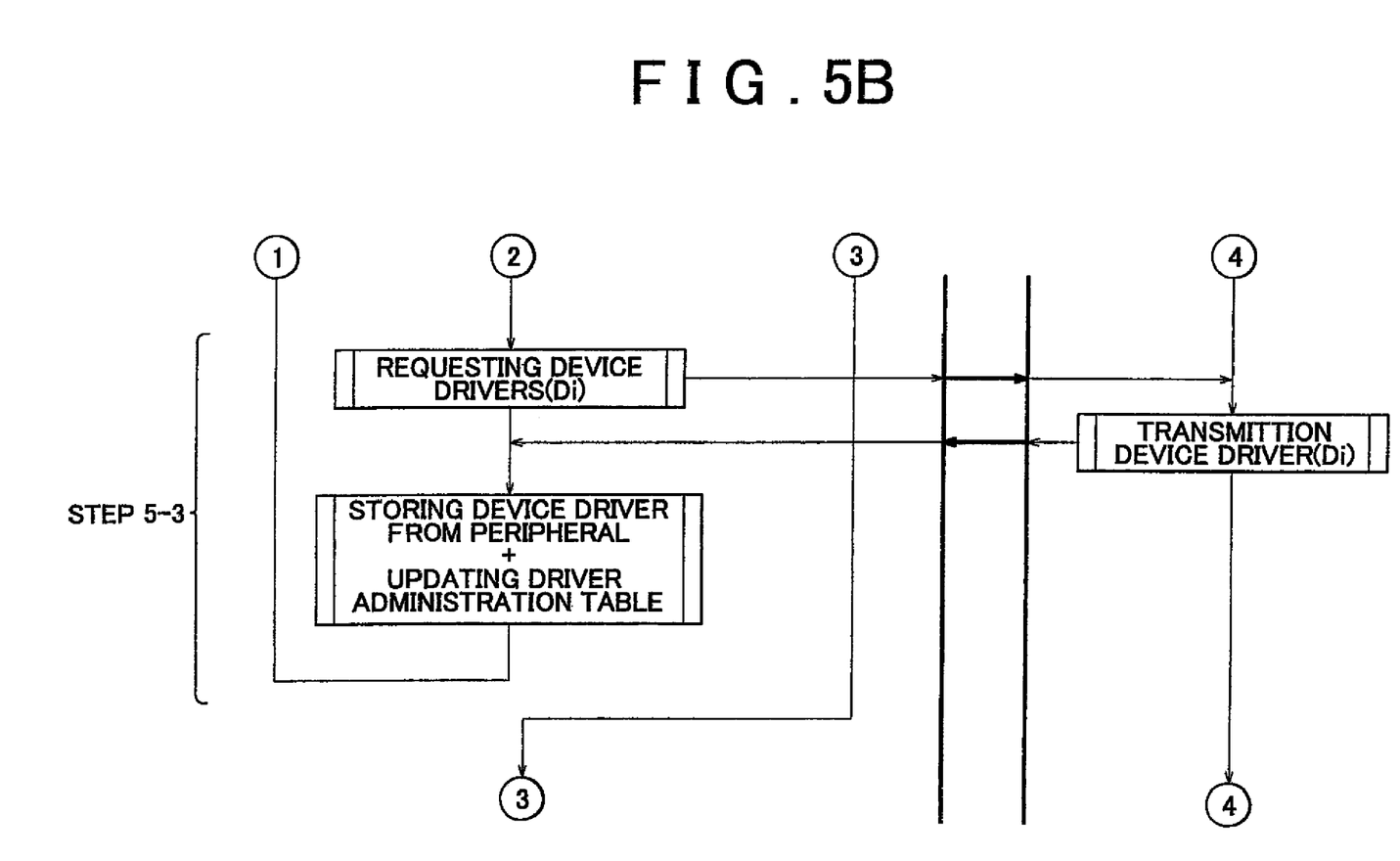
Figure 5C:
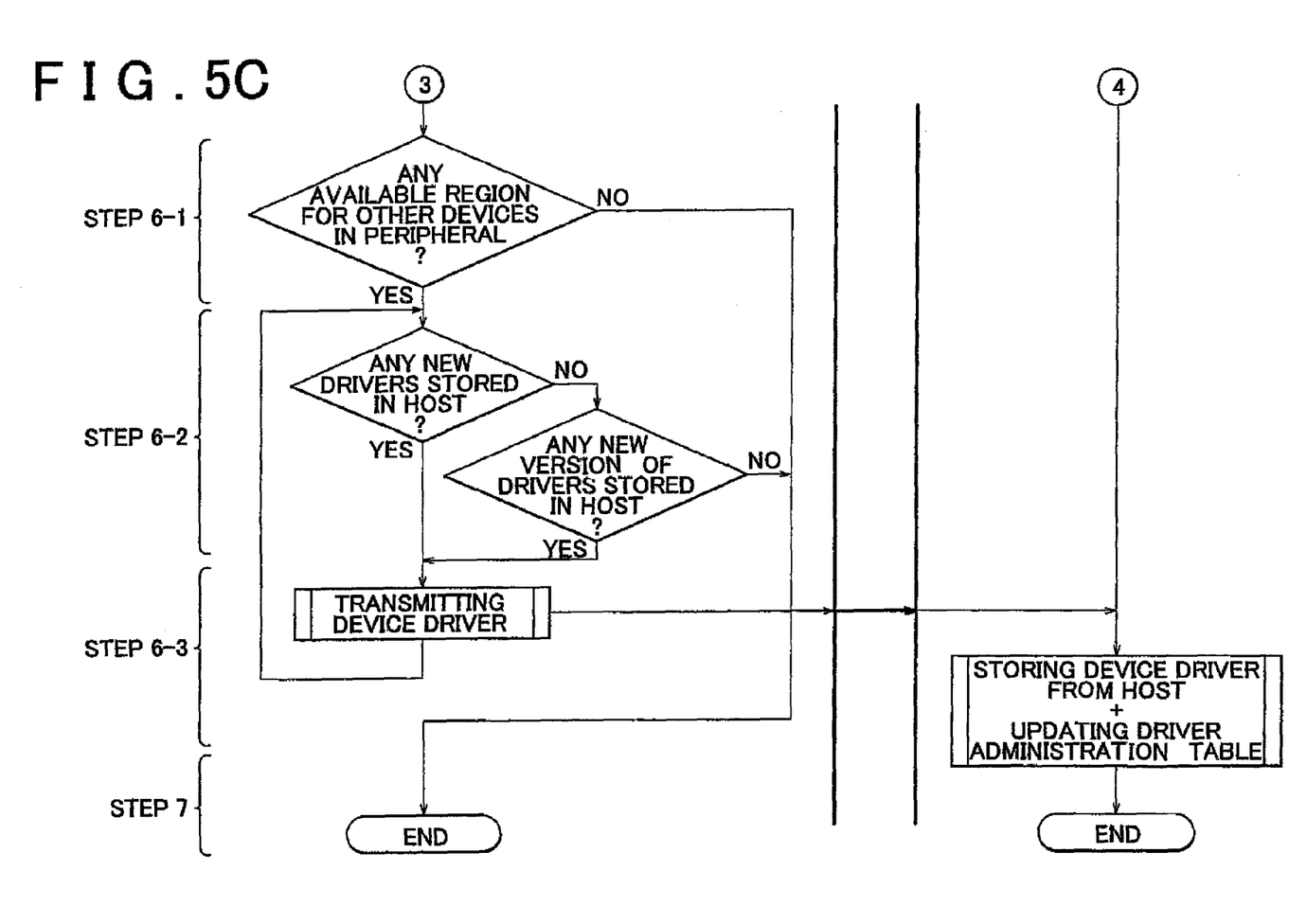

FIGS. 5A-5C are flow charts showing the operation of the second preferred embodiment. The same operation is carried out as the first preferred embodiment, shown in FIGS. 2A and 2B. A feature of the second preferred embodiment is shown in FIGS. 5A-5C, following the operation shown in FIGS. 2A and 2B.

Step 4: Obtaining Device Driver Administration Table

In step 4, the device driver controller 105 transmits a request signal for an administration table to the second USB device 100B using USB communication, controlled by the USB controller 103. The device driver administration table, stored in the non-volatile memory 116 of the second USB device 100B, is supplied to the first USB device 100A.

Step 5: Transmission of Device Driver from the Second USB device 100B to the First USB device 100A

In step 5-1, it is detected whether the device driver region 303 of the first USB device 100A has any available region. If the device driver region 303 has available regions therein, the process would be forwarded to Step 5-2. On the other hand, if the device driver region 303 does not have any available regions therein, the process would be forwarded to Step 6.

In step 5-2, the device driver controller 105 of the first USB device 100A compares the device driver administration table store in the non-volatile memory 106 to the device driver administration table transmitted from the second USB device 100B. The device driver controller 105 determines if the second USB device 100B stores any device drivers that are not stored in the first USB device 100A, and if the second USB device 100B stores any updated (new version) device drivers than that in the first USB device 100A.

When the second USB device 100B stores any device drivers that are not stored in the first USB device 100A, or the second USB device 100B stores any updated (new version) device drivers than that in the first USB device 100A, the process would be forwarded to Step 5-3. On the other hand, when the second USB device 100B does not store any device drivers that are not stored in the first USB device 100A, or the second USB device 100B does not store any updated (new version) device drivers than that in the first USB device 100A, the process would be forwarded to Step 6.

Step 5-3

When the second USB device 100B stores any device drivers that are not stored in the first USB device 100A, or the second USB device 100B stores any updated (new version) device drivers than that in the first USB device 100A, the following process is carried out:

The device driver controller 105 of the first USB device 100A transmits a request signal for device driver(s) to the second USB device 100B using USB communication technique controlled by the USB controller 103. The request signal includes a device driver address of the requested device driver in the device driver administration table, which is stored in the non-volatile memory 116 of the second USB device 100B. It is assumed that the device driver address is "Di". When the device driver controller 115 of the second USB device 100B receives the request signal, the device driver controller 115 transmits a device driver identified by the address "Di" to the first USB device 100A.

When the first USB device 100A received the device driver for the address "Di", the device driver controller 105 stores the device driver in an available room of the device driver region 303 in the non-volatile memory 106. It is assumed that the device driver is stored at an address "Dj" of the device driver region 303. The device driver controller 105 also stores necessary information, including a manufacture, product info. and version info. for the received device driver, at the address "Dj" of the device driver administration table 105 in the non-volatile memory 106 so that the table 105 is updated.

Thus a transmission process of a device driver from the second USB device 100B to the first USB device 100A is completed. If the second USB device 100B stores any other device drivers that are not stored in the first USB device 100A, or the second USB device 100B stores any other updated (new version) device drivers than that in the first USB device 100A, the process would be returned to the beginning of Step 5-2.

Step 6: Transmission of Device Driver from the First USB device 100A to the Second USB device 100B

In step 6-1, it is detected whether the device driver region 303 of the second USB device 100B has any available region. If the device driver region 303 has available regions therein, the process would be forwarded to Step 6-2. On the other hand, if the device driver region 303 does not have any available regions therein, the process would be forwarded to Step 7.

In step 6-2, the device driver controller 115 of the second USB device 100B compares the device driver administration table store in the non-volatile memory 116 to the device driver administration table transmitted from the first USB device 100A. The device driver controller 115 determines if the first USB device 100A stores any device drivers that are not stored in the second USB device 100B, and if the first USB device 100A stores any updated (new version) device drivers than that in the second USB device 100B.

When the first USB device 100A stores any device drivers that are not stored in the second USB device 100B, or the first USB device 100A stores any updated (new version) device drivers than that in the second USB device 100B, the process would be forwarded to Step 6-3. On the other hand, when the first USB device 100A does not store any device drivers that are not stored in the second USB device 100B, or the first USB device 100A does not store any updated (new version) device drivers than that in the second USB device 100B, the process would be forwarded to Step 7.

Step 6-3

When the first USB device 100A stores any device drivers that are not stored in the second USB device 100B, or the first USB device 100A stores any updated (new version) device drivers than that in the second USB device 100B, the following process is carried out:

The device driver controller 115 of the second USB device 100B transmits a request signal for device driver(s) to the first USB device 100A using USB communication technique controlled by the USB controller 113. The request signal includes a device driver address of the requested device driver in the device driver administration table, which is stored in the non-volatile memory 106 of the first USB device 100A. When the device driver controller 105 of the first USB device 100A receives the request signal, the device driver controller 105 transmits a device driver to the second USB device 100B.

When the second USB device 100B receives the device driver, the device driver controller 115 stores the device driver in an available room of the device driver region 303 in the non-volatile memory 116. It is assumed that the device driver is stored at an address "Dk" of the device driver region 303. The device driver controller 105 also stores necessary information, including a manufacture, product info. and version info. for the received device driver, at the address "Dk" of the device driver administration table 105 in the non-volatile memory 106 so that the table 105 is updated.

Thus a transmission process of a device driver from the first USB device 100A to the second USB device 100B is completed. If the first USB device 100A stores any other device drivers that are not stored in the second USB device 100B, or the first USB device 100A stores any other updated (new version) device drivers than that in the second USB device 100B, the process would be returned to the beginning of Step 6-2.

What is claimed is:

1. A USB device set, comprising:
    a first USB device, which is operable both as a host device and as a peripheral device; and
    a second USB device, which is operable both as a host device, and as a peripheral device, wherein
    each of the first and second USB devices includes
        a first memory region storing device drivers of other USB devices,
        a second memory region storing its own device driver, and
        a device driver control circuit, which can update device drivers stored at least in the first memory region,
    wherein in one of the first and second USB devices that is operating as a peripheral device, the device driver control circuit receives first information on the device driver of the other USB device operating as a host device, when the first and second USB devices are firstly connected to each other, and updates the first memory region in the one USB device operating as the peripheral device in accordance with the received first information,
    wherein in the other USB device operating as the host device, the device driver control circuit receives second information on the device driver of the one USB device operating as the peripheral device, when the first and second USB devices are firstly connected to each other, and updates the first memory region in the other USB device operating as the host device in accordance with the received second information, to provide two-way transmission of device driver information, and
    wherein the device driver control circuits of the first and second USB devices respectively receive from the second and first USB devices third and fourth information on device drivers of additional USB devices when the first and second USB devices are firstly connected to each other, and respectively update the first memory regions according to the third and fourth information.

2. A USB device set according to claim 1, wherein the device driver control circuit compares the device drivers stored in the first memory region with a device driver transmitted from the second memory region of the other USB device before updating the device driver stored in the first memory region.

3. A USB device set according to claim 1, wherein the second memory region is arranged in the device driver control circuit.

4. A USB device set according to claim 1, wherein the first and second memory regions are organized using a device driver managing table, which stores at least a manufacturer and version information for each device driver.

5. A USB device set comprising:
    a first USB device operable as a host device and a peripheral device, the first USB device storing a device driver of the first USB device and device drivers of other USB devices, and
    a second USB device operable as a host device and a peripheral device, the second USB device storing a device driver of the second USB device and the device drivers of the other USB devices,
    wherein a device driver controller of one of the first and second USB devices operating as a peripheral device receives first device driver information of another of the first and second USB devices operating as a host device and of the other USB devices when the first and second USB devices are initially interconnected, and updates the device drivers of the another of the first and second USB devices operating as the host device and the other USB devices stored therein responsive to the received first device driver information, and
    wherein a device driver controller of the another one of the first and second USB devices operating as the host device receives second device driver information of the one of the first and second USB devices operating as the peripheral device and of the other USB devices when the first and second USB devices are initially interconnected, and updates the device drivers of the one of the first and second USB devices operating as the peripheral device and the other USB devices stored therein responsive to the received second device driver information, to provide two-way transmission of device driver information.

6. The USB device set of claim 5, wherein the device drivers as stored in the first and second USB devices are organized using device driver management tables that store at least a manufacturer and version information for each device driver.

7. A USB device operable as both a host device and a peripheral device, comprising:
   a first memory region storing device drivers of another USB device and other USB devices,
   a second memory region storing a device driver of the USB device, and
   a device driver control circuit, which updates a device driver stored at least in the first memory region,
   wherein upon being initially coupled to the another USB device, the device driver control circuit receives first information of a device driver of the another USB device and device drivers of the other USB devices, updates the first memory region in accordance with the received first information, and sends second information on the device driver of the USB device to the another USB device, to provide two-way transmission of device driver information prior to further communication, regardless of whether the USB device operates as the host device or the peripheral device.

8. A USB device according to claim 7, wherein the device driver control circuit compares the device drivers stored in the first memory region with device drivers of the other USB devices, before updating the device drivers stored in the first memory region.

9. A USB device according to claim 7, wherein the second memory region is arranged in the device driver control circuit.

10. A USB device set according to claim 7, wherein the first and second memory regions are organized using a device driver managing table, which stores at least a manufacturer and version information for each device driver.

* * * * *